(12) United States Patent
Yamasaki et al.

(10) Patent No.: US 11,448,663 B2
(45) Date of Patent: Sep. 20, 2022

(54) PATTERN HEIGHT INFORMATION CORRECTION SYSTEM AND PATTERN HEIGHT INFORMATION CORRECTION METHOD

(71) Applicant: Hitachi High-Tech Corporation, Tokyo (JP)

(72) Inventors: Kenji Yamasaki, Tokyo (JP); Hiroyuki Shindo, Tokyo (JP); Taeko Kashiwa, Tokyo (JP); Ryugo Kagetani, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 82 days.

(21) Appl. No.: 16/984,813

(22) Filed: Aug. 4, 2020

(65) Prior Publication Data
US 2021/0080485 A1 Mar. 18, 2021

(30) Foreign Application Priority Data

Sep. 12, 2019 (JP) .............................. JP2019-166105

(51) Int. Cl.
*G01Q 30/06* (2010.01)
*G01B 11/24* (2006.01)
*G01Q 60/38* (2010.01)

(52) U.S. Cl.
CPC ............. *G01Q 30/06* (2013.01); *G01B 11/24* (2013.01); *G01Q 60/38* (2013.01)

(58) Field of Classification Search
CPC . G01Q 30/04; G01Q 30/23; G01Q 30/32–363
See application file for complete search history.

(56) References Cited

U.S. PATENT DOCUMENTS

2007/0251306 A1* 11/2007 Zhou ...................... G01Q 40/00
73/105
2016/0139311 A1 5/2016 Ding et al.

FOREIGN PATENT DOCUMENTS

| CN | 1042049944 B | | 7/2018 | |
|---|---|---|---|---|
| CN | 110068707 A | * | 7/2019 | ............. G01Q 60/24 |
| JP | 2002-31589 A | | 1/2002 | |

OTHER PUBLICATIONS

Taiwanese-language Office Action issued in Taiwanese Application No. 109128921 dated Apr. 28, 2022 (four (4) pages).

* cited by examiner

*Primary Examiner* — Eliza W Osenbaugh-Stewart
(74) *Attorney, Agent, or Firm* — Crowell & Moring LLP

(57) ABSTRACT

This invention is directed to a pattern height information correction system which includes a contour line information of a pattern extracted from an acquired image including at least an AFM (atomic force microscope) module, a design information database that stores design information including at least layer information, and a computer system that divides the extracted pattern into regions based on the design information stored in the design information database relating to the extracted pattern and associates the divided regions with layer information, in which the computer system specifies a horizontal region designated as horizontal in advance from the divided regions, creates an approximated curved surface based on the specified horizontal region corresponding to the same layer information, and corrects height information of the extracted pattern using the approximated curved surface.

10 Claims, 9 Drawing Sheets

| HORIZONTAL LAYER DESIGNATION ||
|---|---|
| HORIZONTAL DESIGNATION | LAYER No. |
| HORIZONTAL | 3 |
|  | 5 |
| HORIZONTAL | 6 |
|  | 12 |

PATTERN HEIGHT INFORMATION CORRECTION SYSTEM AND PATTERN HEIGHT INFORMATION CORRECTION METHOD

CLAIM OF PRIORITY

The present application claims priority from Japanese Patent application serial no. 2019-166105, filed on Sep. 12, 2019, the content of which is hereby incorporated by reference into this application.

TECHNICAL FIELD

The present invention relates to a system and method for evaluating pattern height information of a semiconductor pattern formed on a substrate.

BACKGROUND ART

A scanning probe microscope (SPM) is used as a technique for observing or inspecting a surface shape of a sample in a semiconductor process. A displacement amount due to disturbance or apparatus characteristics may be added to height information obtained by the scanning probe microscope. In order to correct this, for example, a technique described in PTL 1 is known.

In PTL 1, a scanning probe microscope provided with a probe disposed to face the sample, a Z-direction scanner driven in the Z-direction, an X, Y-direction scanner for scanning in the X- and Y-directions, a measurement head for detecting displacement of the probe, and Z-direction correction means for correcting a macro variation in the macro Z-direction from a reference height is described. As a first form of the Z-direction correction means, it is disclosed that correction data in the Z-direction with respect to a position in the X- and Y-directions for compensating variation in the Z-direction is provided and a drive amount of the Z-direction scanner is corrected based on the correction data. As a second form of the Z-direction correction means, it is disclosed that an inclined stage that allows an inclination angle against a reference plane of the scanning probe microscope to be adjusted in one or two directions between a sample stage and the sample is provided and inclination due to the characteristics of the sample or the scanner is corrected by the inclined stage.

CITATION LIST

Patent Literature

PTL 1: JP-A-2002-31589

SUMMARY OF INVENTION

Technical Problem

However, when a local shift amount due to atmospheric pressure variation and/or vibration in a clean room occurs, although a macro displacement can be corrected by the configuration disclosed in PTL 1, it is feared that it is not possible to cope with a case where the local shift amount occurs by being superimposed on the macro displacement.

Accordingly, the present invention provides a pattern height information correction system and a pattern height information correction method capable of acquiring height information of a sample obtained by excluding a local shift amount due to disturbance such as atmospheric pressure variation and/or vibration from an image, in which the shift amount is superimposed on the height information of the sample, acquired by an atomic force microscope (AFM).

Solution to Problem

In order to solve the problems described above, a pattern height information correction system according to the present invention includes contour line information of a pattern extracted from an acquired image including at least an atomic force microscope, a design information database that stores design information including at least layer information, and a computer system that divides the extracted pattern into regions based on the design information stored in the design information database relating to the extracted pattern and associates the divided regions with layer information, and the computer system specifies a horizontal region designated as horizontal in advance from the divided regions, creates an approximated curved surface based on the specified horizontal region corresponding to the same layer information, and corrects height information of the extracted pattern using the approximated curved surface.

A pattern height information correction method according to the present invention is a pattern height information correction method which is used in a pattern height information correction system which includes contour line information of a pattern extracted from an acquired image including at least an atomic force microscope, a design information database that stores design information including at least layer information, and a computer system that divides the extracted pattern into regions based on the design information stored in the design information database relating to the extracted pattern and associates the divided regions with layer information, and includes, by the computer system, specifying a horizontal region designated as horizontal in advance from the divided regions, creating an approximated curved surface based on the specified horizontal region corresponding to the same layer information, and correcting height information of the extracted pattern using the approximated curved surface.

Advantageous Effects of Invention

According to the present invention, it is possible to provide a pattern height information correction system and a pattern height information correction method capable of acquiring height information of a sample obtained by excluding a local shift amount due to disturbance such as atmospheric pressure variation and/or vibration from an image, in which the shift amount is superimposed on the height information of the sample, acquired by an atomic force microscope (AFM).

Problems, configurations, and effects other than those described above will be apparent from the following description of the embodiments.

DESCRIPTION OF EMBODIMENTS

The present invention is a pattern height information correction system (semiconductor measurement system) capable of acquiring height information of a sample obtained by excluding not only a macro displacement but also a local shift amount from at least an image acquired by an atomic force microscope (AFM) when the local shift due to disturbance such as atmospheric pressure variation and/or vibration with a shift amount (macro displacement) is superimposed on the height information of sample. In the following, an example of the present invention will be described with reference to the drawings by taking a semiconductor measurement system including a semiconductor inspection apparatus in which an AFM is mounted on a top plate of a vacuum sample chamber of a scanning electron microscope (SEM) as an example.

Example 1

(System Configuration)

Figure 1:
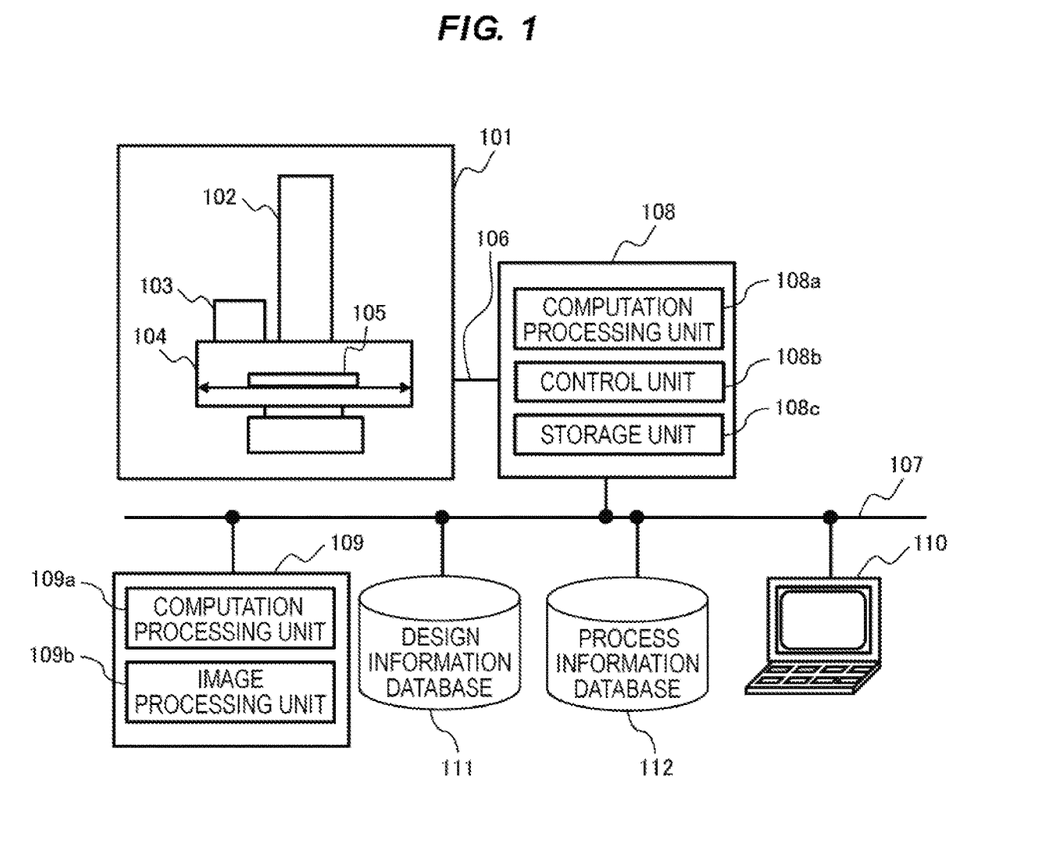
FIG. 1 is an overall schematic configuration diagram of a semiconductor measurement system according to an example of the present invention.

FIG. 1 is an overall schematic configuration diagram of a semiconductor measurement system according to an example of the present invention, which is a semiconductor measurement system in which a computer system to which a measurement apparatus or inspection device in which the AFM and SEM are integrated is connected is connected to a network.

As illustrated in FIG. 1, in the semiconductor measurement system, an AFM-and-SEM integration device 101, a first computer system 108, a second computer system 109, a design information database 111, a process information database 112, and an input and output device (user PC) 110 are connected to a second network 107.

The AFM-and-SEM integration device 101 has a configuration in which an AFM module 103 is integrated with an electron beam column 102, a vacuum sample chamber 104, and an XY stage 105, which are basic components of the SEM, and is an apparatus capable of acquiring pattern height information data by the AFM in addition to pattern measurement by electron irradiation by the SEM. The height information data specifically means X, Y, Z coordinate values obtained by combining X, Y coordinates indicating a plane coordinate position and Z coordinates indicating a height.

The first computer system 108 is connected to the AFM-and-SEM integration device 101 by a first network 106, and includes a control unit 108b that controls various modules including the electron beam column 102, the XY stage 105, and the vacuum sample chamber 104 of the AFM-and-SEM integration device 101, a computation processing unit 108a that performs various computation processing including signal processing for acquiring measurement target information and imaging processing, and a storage unit 108c for storing and managing the measurement result information.

The second computer system 109 includes a computation processing unit 109a that performs measurement processing, statistical calculation processing, and height information data correction processing of measurement result information, and an image processing unit 109b that performs image processing, output processing, and the like.

The computation processing unit 108a and the control unit 108b configuring the first computer system 108, and the computation processing unit 109a and the image processing unit 109b configuring the second computer system 109 are realized by, for example, a processor such as a central processing unit (CPU) (not illustrated), a ROM for storing various programs, a RAM for temporarily storing data of a computation process, a storage device such as an external storage device, and cause the processor such as the CPU to read and execute various programs stored in the ROM and store a computation result which is the execution result in the RAM or the external storage device.

In the design information database 111, design information of the semiconductor circuit pattern is stored. In the design information, layer information which is information of each layer of the circuit pattern to be stacked, shape information of the circuit pattern of each layer, and the like are stored.

In the process information database 112, process information of the semiconductor circuit pattern is stored. In the process information, detailed information of a manufacturing process, such as process information for each manufacturing step of the semiconductor circuit pattern such as etching and resist coating and processing contents thereof is stored.

The input and output device (user PC) 110 is connected to the second network 107 and performs various operations of the AFM-and-SEM integration device 101 including a recipe execution operation and a recipe creation operation of the first computer system 108. The input and output device (user PC) 110 can remotely perform processing such as measurement processing, statistical calculation processing, and correction processing by connecting to the second computer system 109 via the second network 107. The input and output device (user PC) 110 can also perform inquiry, acquisition, storage, and creation of design data in the design information database 111 via the second network 107. The input and output device 110 can also access the process information database 112 via the second network 107, and can perform inquiry, acquisition, storage, and creation of process information.

The design data is expressed in, for example, a GDS format or an OASIS format, and is stored in the design information database 111 in a predetermined format. The type of design data is not limited as long as software that displays the design data can display the format and can handle it as graphic data. The design information database 111 may be configured to be incorporated in the AFM module 103 or a storage unit (not illustrated) of the first computer system 108 and the second computer system 109.

The process information does not need to be acquired from the process information database as long as the information can specify a process of each layer of the design data. For example, if process information and design data can be compared based on the knowledge of the user via the input and output device 110, a configuration in which the process information database 112 is not included in the semiconductor measurement system may be adopted.

The AFM module 103 of the AFM-and-SEM integration device 101 is not limited to the AFM, and, for example, it goes without saying that the AFM module 103 can be replaced as long as it is an apparatus capable of acquiring semiconductor pattern surface shape information, including a scanning probe microscope which includes a scanning tunnel microscope, which acquires a surface shape using a probe, or an optical surface shape acquisition apparatus.

The SEM focuses an electron beam emitted from an electron source (not illustrated) using a multi-stage lens, and then deflects and scans using a scanning deflector. With this configuration, the electron beam scans the sample surface one-dimensionally or two-dimensionally. Secondary electrons (SE) or backscattered electrons (BSE) emitted from the sample surface by the scanning of the electron beam are detected by a detector and stored in a storage medium such as a frame memory in synchronization with scanning by a scanning deflector. An image signal stored in the frame memory is computed by the computation processing unit 108a configuring the first computer system 108. Scanning by the scanning deflector can be performed in any size, position, and direction. The control and the like described above are executed by the control unit 108b configuring the first computer system 108. Images and corresponding signals acquired by the scanning of the electron beam are sent to the first computer system 108 via the first network 106.

The computation processing unit 108a configuring the first computer system 108 has a function of creating a program (recipe) for controlling the operation of the SEM based on the design data of the semiconductor device, and functions as a recipe setting unit. Specifically, the computation processing unit 108a sets position information (for example, design data, pattern contour line data, desired measurement points, autofocus points, auto-stigma points, addressing points on simulated design data) and the like for causing the SEM to execute necessary processing, and creates a program for automatically controlling the XY stage 105, which is a sample stage of the SEM, the scanning deflector, and the like based on the setting. The computation processing unit 108a configuring the first computer system 108 incorporates or stores a program that causes a dedicated processor or a general-purpose processor to extract information on a region serving as a template from design data and creates a template based on the extracted information.

In this example, a configuration in which the first computer system 108 and the second computer system 109 are integrated may be adopted. However, in consideration of throughput, it is desirable to divide the first computer system 108 and the second computer system 109 as in this example.

(Configuration of Atomic Force Microscope)

Figure 2:
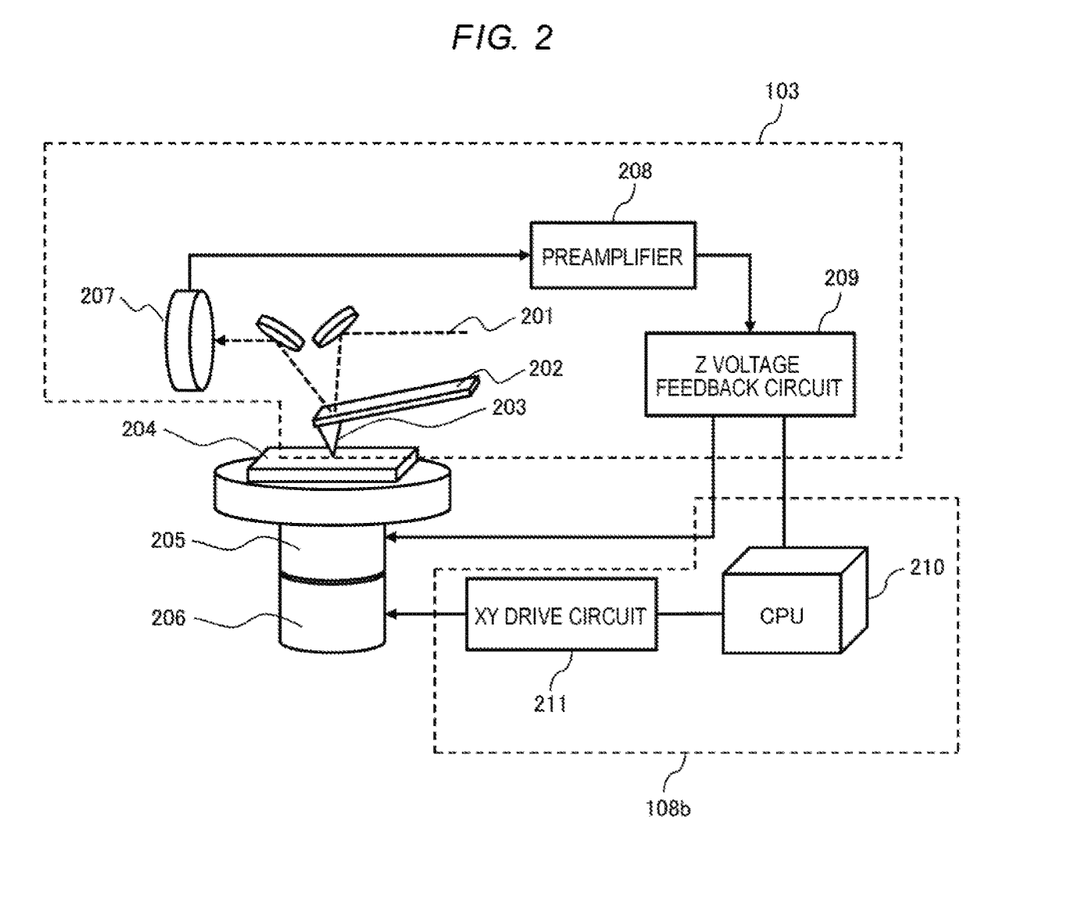
FIG. 2 is a schematic configuration diagram of an AFM module illustrated in FIG. 1.

FIG. 2 is a schematic configuration diagram of the AFM module 103 illustrated in FIG. 1. The AFM is a type of microscope that detects atomic force acting on a probe and a sample.

As illustrated in FIG. 2, a probe 203 is attached to the tip of a cantilever 202, and is brought into contact with the surface of a sample 204 with a very small force, and detects an amount of deflection by detecting a reflection spot of a semiconductor laser 201 irradiating the tip of the cantilever 202 with an optical sensor 207 and performs scanning horizontally while performing feedback control on a distance between the probe 203 and the sample 204, thereby acquiring the surface shape.

The deflection signal of the cantilever 202 is feedback-controlled by a preamplifier 208, a Z voltage feedback circuit 209, a CPU 210, and a XY drive circuit 211.

As illustrated by the dotted line in FIG. 2, the AFM module 103 is configured by the cantilever 202, the probe 203, a conductor laser 201, the optical sensor 207, the preamplifier 208, and the Z voltage feedback circuit 209.

The CPU 210 and the XY drive circuit 211 form the control unit 108b which configures the first computer system 108.

A Z-direction scanner 205 and an X, Y-direction scanner 206 correspond to the XY stage 105 illustrated in FIG. 1. In other words, the XY stage 105 illustrated in FIG. 1 is configured to be movable in the Z-direction in addition to the movement in the X-direction and Y-direction.

The measurement mode of the AFM module 103 is roughly classified into a contact mode and an AC mode for observation and measurement using interatomic repulsion between the surface of the sample 204 and the probe 203, and a non-contact mode for detecting the attractive force between atoms between the surface of the sample 204 and the probe 203, but in the present invention, the mode is not limited.

Figure 3:
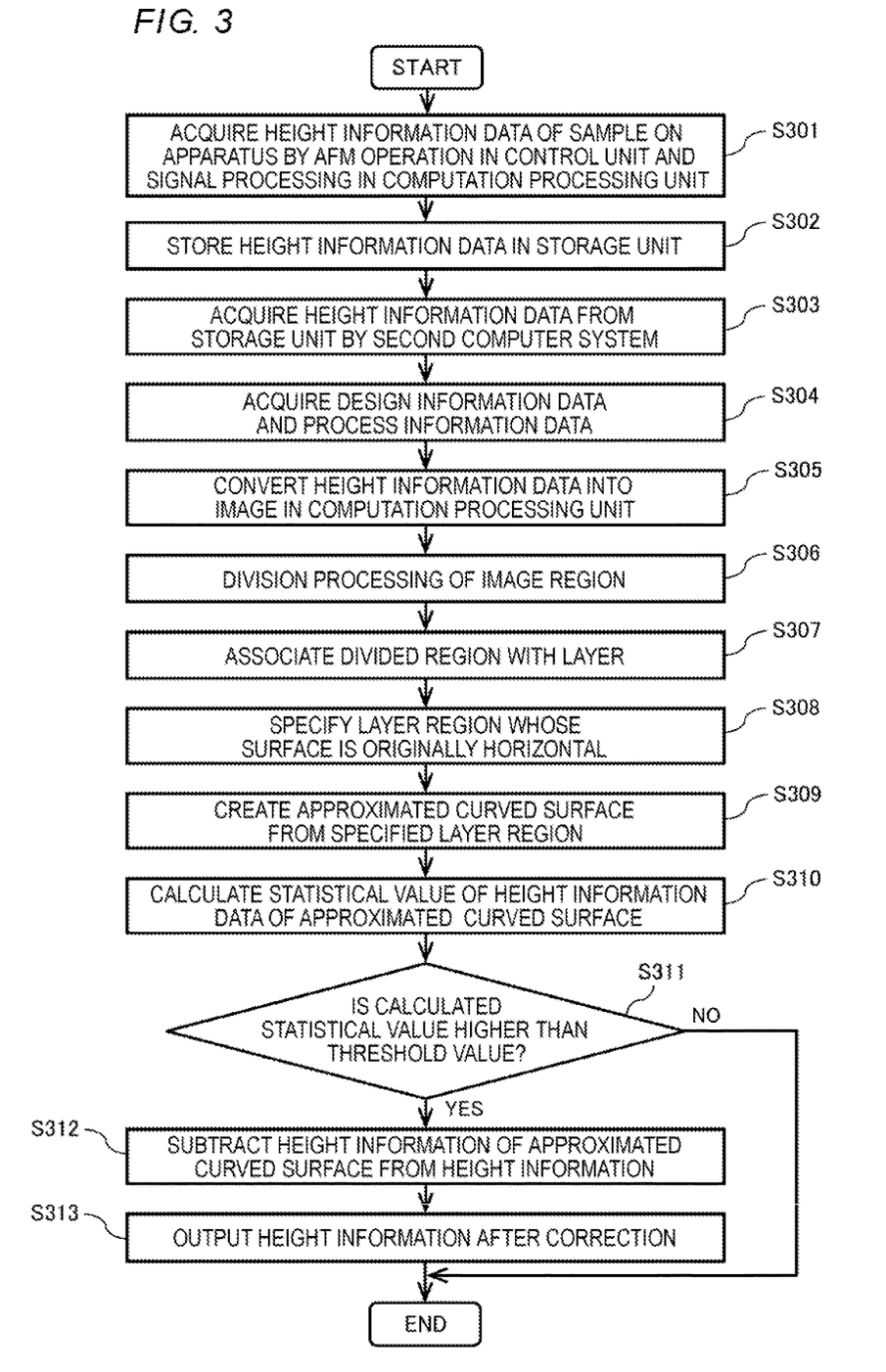
FIG. 3 is a flowchart illustrating a correction method of pattern height information in the semiconductor measurement system.

(Pattern height information correction method) FIG. 3 illustrates a flowchart of a series of measurement processing including correction of height information in the semiconductor measurement system illustrated in FIG. 1. The operations based on the flowchart are as follows.

First, in step S301, the AFM-and-SEM integration device 101 integrating the AFM and the SEM acquires height information data of the sample on the AFM-and-SEM integration device 101 from an AFM operation in the control unit 108b, signal processing in the computation processing unit 108a, and the like according to a recipe created by a user by a recipe creation function of the computation processing unit 108a configuring the first computer system 108. As described above, the height information data specifically means X, Y, and Z coordinate values obtained by combining X and Y coordinates indicating a plane coordinate position and Z coordinates indicating a height.

In step S302, supplementary information including the height information data and acquisition condition information acquired on the AFM-and-SEM integration device 101 is stored in the storage unit 108c configuring of the first computer system 108. Here, the height information data includes a single or a plurality of image sets.

In step S303, the computation processing unit 109a configuring the second computer system 109 acquires the height information data and the supplementary information stored in the storage unit 108c configuring the first computer system 108 via the second network 107.

Furthermore, in step S304, the computation processing unit 109a configuring the second computer system 109 acquires design information data corresponding to the image set from the design information database 111, and acquires process information corresponding to the image set from the process information database 112.

Figure 7:
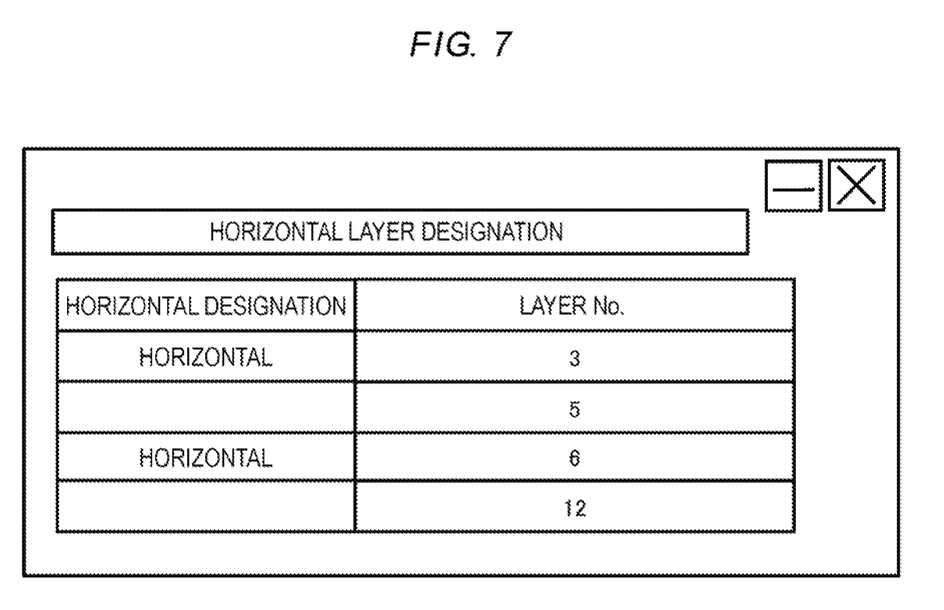
FIG. 7 is a diagram illustrating an example of a display screen of an input and output device illustrated in FIG. 1.

If there is no the process information database 112, the user can designate information of the layer, whose the surface should be originally horizontal, on a display screen (GUI) of the input and output device (user PC) 110 illustrated in FIG. 7. At this time, the second computer system 109 acquires, instead of acquiring the process information, information of the layer whose the surface should be originally horizontal from the information which is set on the display screen (GUI) of the input and output device (user PC) 110. The GUI in FIG. 7 is an example of a part of a software GUI for realizing processing of the second computer system 109. A region for displaying a layer No. and a region for designating whether or not the layer is horizontal exist. As illustrated in FIG. 7, a layer No. 3 is horizontal and a layer No. 5 is not horizontal.

In step S305, the computation processing unit 109a configuring the second computer system 109 converts the height information data into an image. The conversion of the height information data into an image can also be processed on the AFM-and-SEM integration device 101 or the first computer system 108, in which case step S305 is omitted.

In step S306, the computation processing unit 109a configuring the second computer system 109 divides an image region into a pattern portion and other portions using the acquired height information data, supplementary information, and design information data. As a division method, a pattern contour line is extracted using design information data, but is not limited to this. For example, any image processing method capable of pattern division may be used.

Next, in step S307, the computation processing unit 109a configuring the second computer system 109 associates a divided region with the layer information using the layer information included in the design information data for the divided region.

Furthermore, in step S308, the computation processing unit 109a configuring the second computer system 109 specifies a region whose a surface is originally horizontal from the divided region using a layer whose a surface should be originally horizontal in a step process from the layer information of the design information data and the process information data.

Next, in step S309, the computation processing unit 109a configuring the second computer system 109 creates an approximated curved surface over the entire surface in the image using the height information of the specified region. A method of calculating the approximated curved surface can be created by a method using polynomial approximation or the Hermitian curve, but the calculation method is not limited to any one the methods.

In step S310, the computation processing unit 109a configuring the second computer system 109 calculates a statistical value from the height information data of the approximated curved surface obtained in step S309. Here, although the statistical value means all statistical values including basic statistics such as the average, variance, standard deviation, and minimum and maximum values of the height information data, as the statistical value in the computation processing unit 109a configuring the second computer system 109, only a part of the statistical value can be calculated and used as long as it can represent a feature amount of the approximated curved surface.

Next, in step 311, the computation processing unit 109a configuring the second computer system 109 compares the statistical value obtained in step S310 with a threshold value of the statistical value, and determines whether correction is necessary. Here, the threshold value can be set in advance by the user from the input and output device (user PC) 110 in the second computer system 109, and can also be automatically calculated and set by the second computer system 109 from information in the design information database 111 and the process information database 112. In the case of automatic calculation and setting, the computation processing unit 109a configuring the second computer system 109 also has a threshold value calculation processing function. The statistical value used as the threshold value is not limited to one, and the threshold value may be a combination of a plurality of types of statistics such as a combination of a root mean square and a variance.

If the value of the statistical value of the approximated curved surface is below the threshold value, it is determined that no correction is necessary. In this case, correction processing by the computation processing unit 109a configuring the second computer system 109 ends, and the height information is output as it is. The output can also be output to a storage region (not illustrated) of the second computer system 109 or to the input and output device (user PC) 110 or the storage unit 108c configuring the first computer system 108 via the second network 107, and an output destination is not limited to any one of the storage region and the storage unit.

If the value of the statistical value of the approximated curved surface exceeds the threshold value, it is determined that correction is necessary. When it is determined that the correction is necessary, the computation processing unit 109a configuring the second computer system 109 subtracts the height information of the approximated curved surface from the height information, and uses this as height information after correction (step S312).

Next, in step 313, the computation processing unit 109a configuring the second computer system 109 performs output processing of the height information after correction. The output can also be output to a storage region (not illustrated) of the second computer system 109 or to the input and output device (user PC) 110 or the storage unit 108c configuring the first computer system 108 via the second network 107, and an output destination is not limited to any one of the storage region and the storage unit.

Figure 4A:
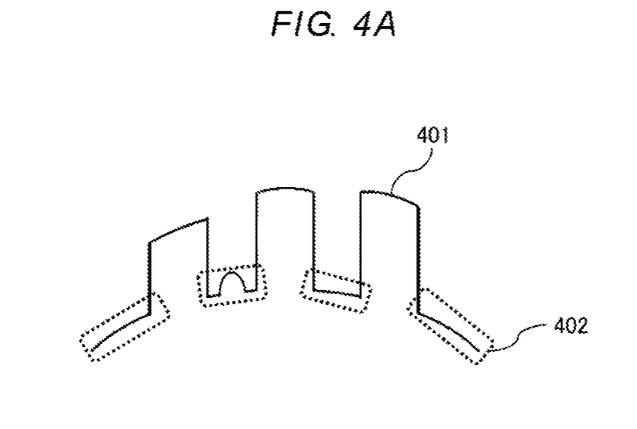
FIG. 4A is a diagram for describing a correction method of pattern height information, and is a diagram when line pattern height information in which a local shift amount due to disturbance is superimposed on actual height information is viewed from the side.
Figure 4B:
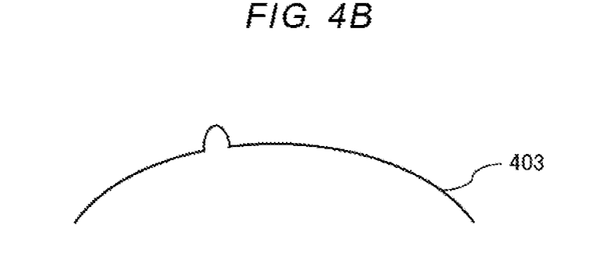
FIG. 4B is a diagram for describing a correction method of pattern height information, and is a diagram illustrating a created approximated curved surface.
Figure 4C:
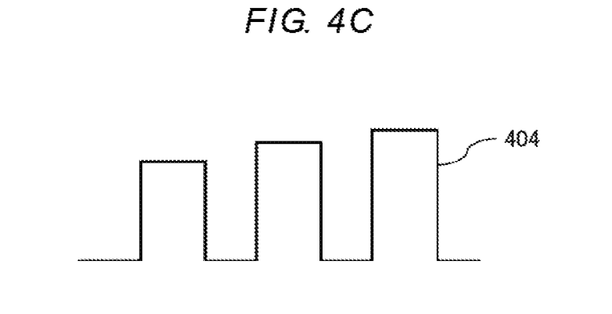
FIG. 4C is a diagram for describing a correction method of pattern height information, and is a diagram illustrating height information after correction.

FIG. 4A is a diagram for describing a correction method of the pattern height information, and is a diagram when line pattern height information in which a local shift amount due to disturbance is superimposed on actual height information is viewed from the side. FIG. 4B is a diagram for describing a correction method of the pattern height information, and is a diagram illustrating a created approximated curved surface. FIG. 4C is a diagram illustrating a correction method of the pattern height information, and is a diagram illustrating height information after correction.

In FIG. 4A, a layer 401 of a line pattern (pattern portion) before correction and a layer 402 which should be horizontal before correction are illustrated. That is, the layer 402 is a layer portion which should be originally horizontal and specified in step S308 of FIG. 3. Further, in one layer portion of the layer 402 which should be horizontal before correction, a local shift amount (a convex portion in FIGS. 4A to 4C) exists.

FIG. 4B is an approximated curved surface created by using information of the region of the layer 402 which should be horizontal in step S309 of FIG. 3. FIG. 4C illustrates height information after correction obtained after the correction processing is performed by subtracting the height information of FIG. 4B from the height information of FIG. 4A. As illustrated in FIG. 4A, when a layer region which should be originally horizontal to be used for calculating an approximated curved surface is present over a plurality of regions, reliability of the approximated curved surface can be improved by creating an approximated curved surface by combining the regions of the same layer.

When creating an approximated curved surface, in the case where an area ratio of the layer region that should be horizontal to be used for calculating the approximated curved surface in the acquired image is significantly smaller than the area ratio of the other regions, the reliability can be improved by creating an approximated curved surface by increasing a weight of the height information of the region to be horizontal and decreasing the weight of the other regions.

Figure 5:
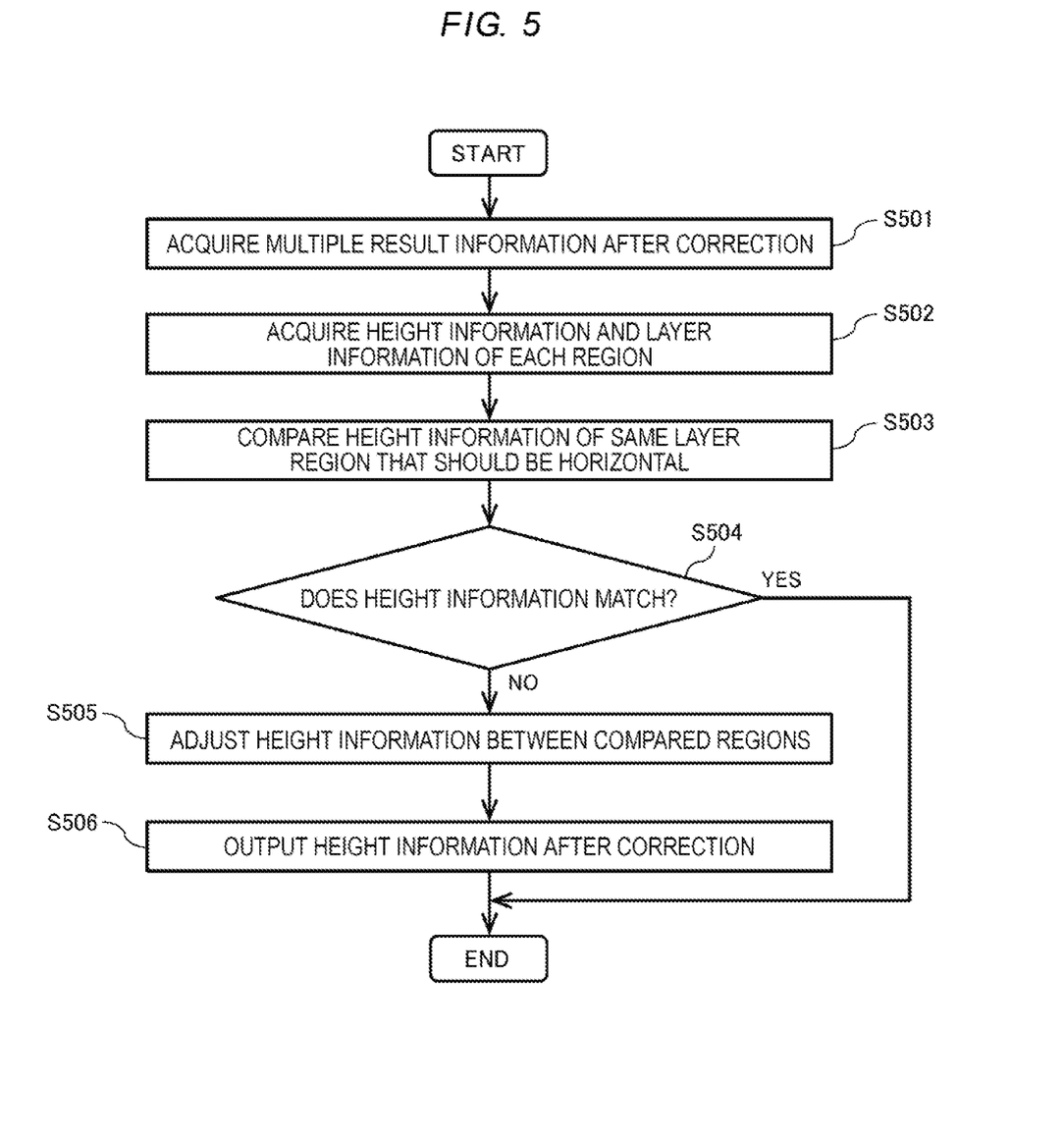
FIG. 5 is a flowchart illustrating a method of correcting a shift amount between a plurality of height information images in the semiconductor measurement system illustrated in FIG. 1.

FIG. 5 is a flowchart illustrating a correction method of a shift amount between a plurality of height information images in the semiconductor measurement system illustrated in FIG. 1. In the case where a plurality of height information images after the processing illustrated in FIG. 3 exist in the computation processing unit 109a configuring the second computer system 109 illustrated in FIG. 1 (step S501), the height information and the layer information of each divided region are acquired (step S502).

In step S503, the computation processing unit 109a configuring the second computer system 109 compares the height information of the same layer region which should be horizontal between the multiple images, and determines whether or not the height information matches (step S504). When the height information matches, processing ends. When the height information does not match, the height information is adjusted between the compared images (step S505).

The value of the height to be adjusted is set by height information of any one of the multiple images or by the user, the first computer system 108 or the second computer system 109. Finally, the height information after correction is output (step S506). The output can also be output to a storage region (not illustrated) of the second computer system 109 or to the input and output device (user PC) 110 or the storage unit 108c configuring the first computer system 108 via the second network 107, and an output destination is not limited to any one of the storage region and the storage unit. Step S502 can be omitted when the second computer system 109 already holds information in the processing illustrated in FIG. 3.

Figure 6A:
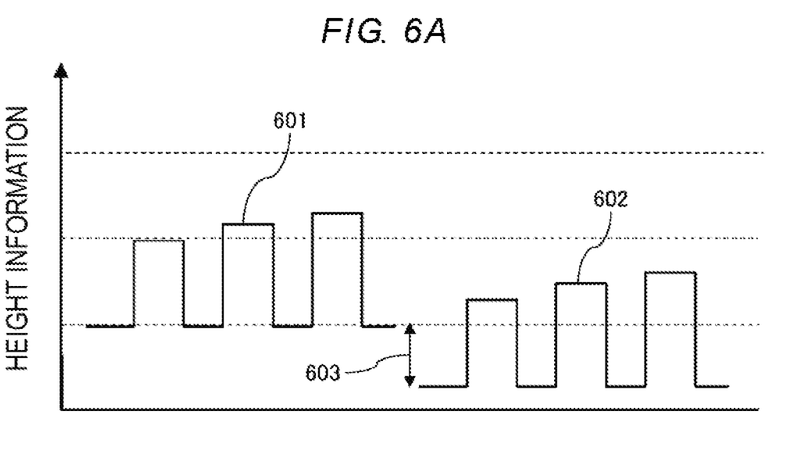
FIG. 6A is a diagram for describing a method of correcting a shift amount between multiple images, and is a diagram illustrating height information and a shift amount between the multiple images before correction.
Figure 6B:
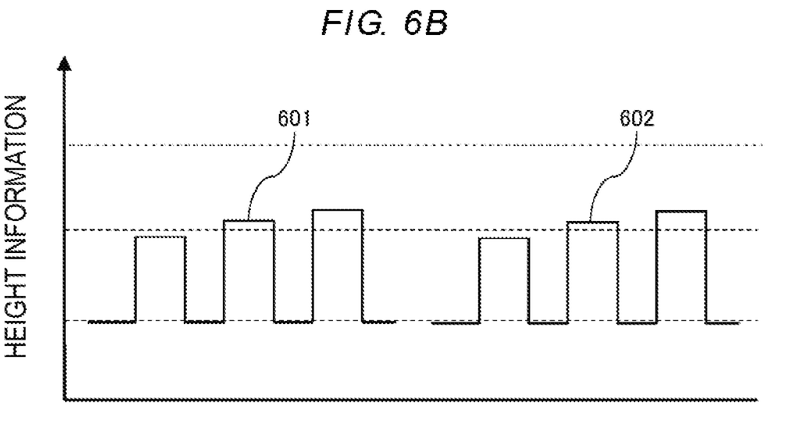
FIG. 6B is a diagram for describing a method of correcting the shift amount between the multiple images, and is a diagram illustrating height information amount between the multiple images after correction.

FIG. 6A is a diagram for describing a method of correcting a shift amount between multiple images, and is a diagram illustrating height information and a shift amount between multiple images before correction. FIG. 6B is a diagram for describing a method of correcting a shift amount between multiple images, and is a diagram illustrating height information between the multiple images after correction.

As illustrated in FIG. 6A, when a first height information image 601 and a second height information image 602 are determined, from information of the divided region associated with the layer, that the bottom region portion is a region that should be originally horizontal, height information of both the first height information image and the second height information image are adjusted to be the same. In the example illustrated in FIG. 6A, processing is performed so that the bottom area of the second height information image 602 matches the bottom area of the first height information image 601 so as to eliminate the shift amount 603 of the height information between the multiple images (601, 602).

As a result, as illustrated in FIG. 6B, the height information between the multiple images (601, 602) after correction is obtained.

As described above, according to the present invention, it is possible to provide a pattern height information correction system and a pattern height information correction method capable of acquiring sample height information obtained by excluding a local shift amount due to disturbance such as atmospheric pressure variation and/or vibration from an image acquired by an atomic force microscope (AFM) in which the shift amount is superimposed on sample height information.

Specifically, it is possible to perform correction by subtracting only the shift amount from the sample surface information in which the shift amount is combined with the actual surface information. In addition, it is possible to adjust the shift amount of height information between multiple images.

Example 2

Figure 8:
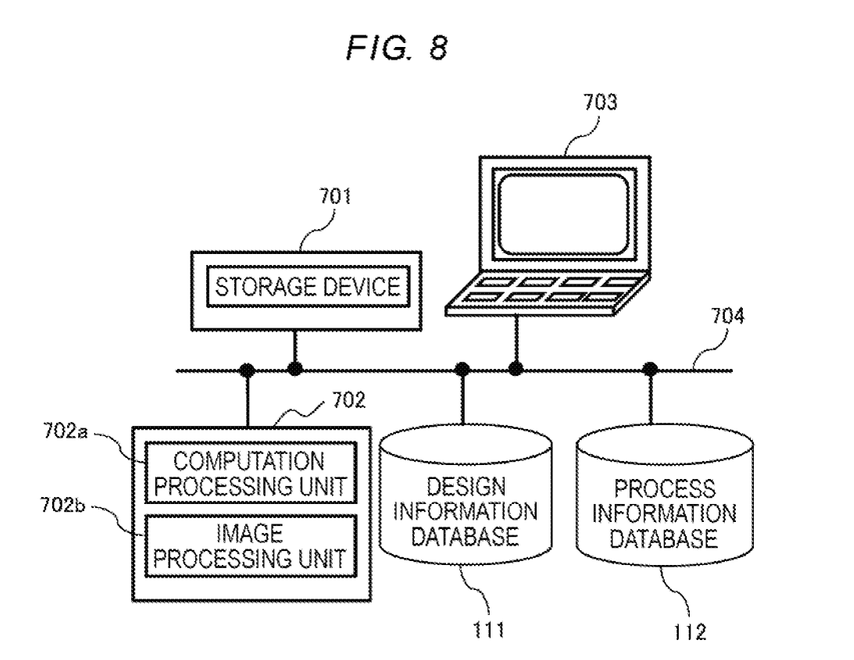
FIG. 8 is an overall schematic configuration diagram of a pattern height information correction system according to another example of the present invention.

FIG. 8 is an overall schematic configuration diagram of a pattern height information correction system according to another embodiment of the present invention. The first embodiment has a configuration including the AFM-and-SEM integration device 101, the first computer system 108, and the second computer system 109, whereas this example is different from Example 1 in that a height information storage device 701 and a computer system 702 are included instead. Other configurations are the same as those of Example 1 described above. In the following, the same components as those of Example 1 are denoted by the same reference numerals.

As illustrated in FIG. 8, in the pattern height information correction system, a height information storage device 701, a computer system 702, the design information database 111, the process information database 112, and an input and output device (user PC) 703 are connected to a network 704.

The height information storage device 701 is configured by a server or a storage medium that stores height information, and stores height information of a semiconductor pattern. The height information may be converted into an image and stored as a height information image.

The computer system 702 includes a computation processing unit 702a that performs measurement processing, statistical calculation processing, and correction processing of measurement result information, and an image processing unit 702b that performs image processing, output processing, and the like.

In the design information database 111, design information of the semiconductor circuit pattern is stored. In the design information, layer information which is information of each layer of the circuit pattern to be stacked, shape information of the circuit pattern of each layer, and the like are stored.

The input and output device (user PC) 703 is connected to the network 704, and can remotely perform processing such as measurement processing, statistical calculation processing, and correction processing by being connected to the computer system 702. The input and output device (user PC) 703 can also store design data in the design information database 111 and create the design data.

A storage location of the height information or the height information image is not limited to the height information storage device 701, and may be stored in the computer system 702 or the input and output device (user PC) 703.

Figure 9:
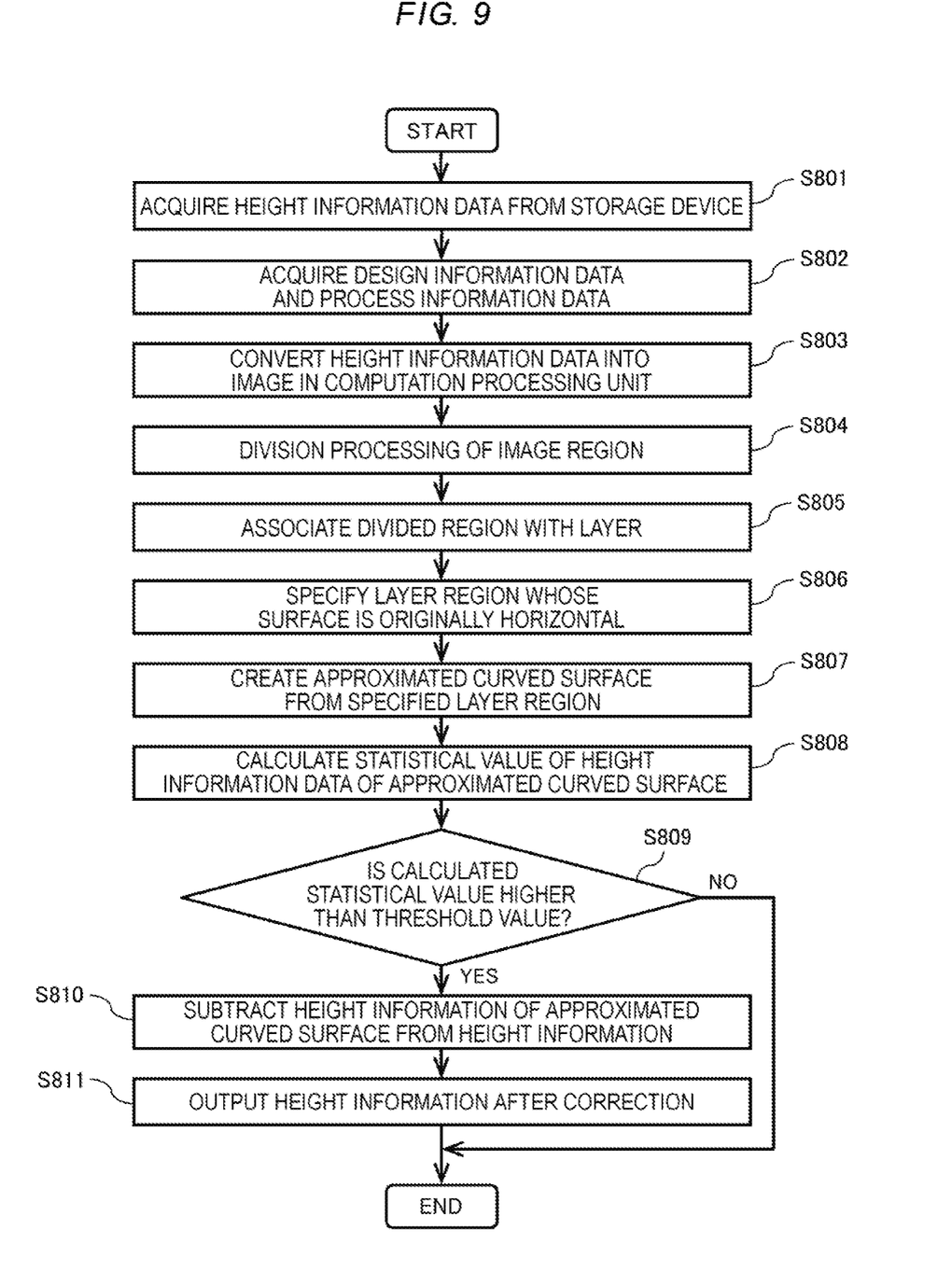
FIG. 9 is a flowchart illustrating a correction method of a correction system for pattern height information.

FIG. 9 illustrates a flowchart of height information correction processing in the pattern height information correction system illustrated in FIG. 8. The operations based on the flowchart are as follows.

First, in step S801, the computer system. 702 acquires height information data and supplementary information from the height information storage device 701 via the network. The height information data may be either height information or a height information image obtained by converting the height information into an image.

Furthermore, in step S802, the computation processing unit 702a configuring the computer system 702 acquires design information data corresponding to the image set from the design information database 111, and acquires process information corresponding to the image set from the process information database 112.

If there is no process information database 112, the user can designate information of the layer, whose surface should be originally horizontal, on the display screen (GUI) of the input and output device (user PC) 703 illustrated in FIG. 7. At this time, the computation processing unit 702a configuring the computer system 702 acquires, instead of acquiring the process information, information of the layer whose surface should be originally horizontal from the information which is set on the display screen (GUI) of the input and output device (user PC) 703. The GUI in FIG. 7 is an example of a part of a software GUI for realizing processing of the computer system 702. A region for displaying a layer No. and a region for designating whether or not the layer is horizontal exist.

In step S803, the computation processing unit 702a configuring the computer system 702 converts the height information data into an image.

In step S804, the computation processing unit 702a configuring the computer system 702 divides an image region into a pattern portion and other portions using the acquired height information data, supplementary information, and design information data. As a division method, a pattern contour line is extracted using design information data. However, the method of realizing the division is not limited as long as it is an image processing method capable of dividing a pattern.

Next, in step S805, the computation processing unit 702a configuring the computer system 702 associates a divided region with the layer information using the layer information included in the design information data for the divided region.

Furthermore, in step S806, the computation processing unit 702a configuring the computer system 702 specifies a region whose surface is originally horizontal from the divided region using a layer whose surface should be originally horizontal in a step process from the layer information of the design information data and the process information data.

Next, in step S807, the computation processing unit 702a configuring the computer system 702 creates an approximated curved surface over the entire surface in the image using the height information of the specified region. A method of calculating the approximated curved surface can be created by a method using polynomial approximation or a Hermitian curve, but the calculation method is not limited.

In step S808, the computation processing unit 702a configuring the computer system 702 calculates a statistical value from the height information data of the approximated curved surface obtained in step S807. Although the statistical value means all statistical values including basic statistics such as the average, variance, standard deviation, and minimum and maximum values of the height information data, as the statistical value used in the computer system, only a part of the statistical value can be calculated and used as long as it can represent the feature amount of the approximated curved surface.

Next, the computer system compares the statistical value obtained in step 808 with a threshold value of the statistical value, and in step S809, determines whether or not correction is necessary. The threshold value can be set in advance by the user from the input and output device (user PC) 703 in the computer system 702, and can also be automatically calculated and set by the computer system 702 from information in the design information database 111 and the process information database 112. In the case of automatic calculation and setting, the computation processing unit 702a configuring the computer system 702 also has a threshold value calculation processing function. The statistical value used as the threshold value is not limited to one, and the threshold value may be a combination of a plurality of types of statistics such as a combination of a root mean square and a variance.

If the value of the statistical value of the approximated curved surface is below the threshold value, it is determined that no correction is necessary. In this case, correction processing by the computation processing unit 702a configuring the computer system 702 ends, and the height information is output as it is. The output can also be output to a storage region (not illustrated) of the computer system or to the input and output device (user PC) 703 via the network 704, and an output destination is not limited to any one of the storage region and the input and output device.

If the value of the statistical value of the approximated curved surface exceeds the threshold value, it is determined that correction is necessary. When it is determined that the correction is necessary, the computation processing unit 702a configuring the computer system 702 subtracts the height information of the approximated curved surface from the height information, and uses this as height information after correction (step S810).

Next, in step 811, the computation processing unit 702a configuring the computer system 702 performs output processing of the height information after correction. The output can also be output to a storage region (not illustrated) of the computer system 702 or to the input and output device (user PC) 703 via the network 704, and an output destination is not limited to one.

The flowchart of FIG. 5 illustrated in Example 1 described above can be applied to a method of correcting a shift amount between a plurality of height information images by the pattern height information correction system of this example illustrated in FIG. 8. When a plurality of pieces of height information after being subjected to processing illustrated in FIG. 9 are present in the computation processing unit 702a configuring the computer system 702 of FIG. 8 (step S501), height information and layer information of each of the divided areas are obtained (step S502).

In step S503, the computation processing unit 702a configuring the computer system 702 compares the height information of the same layer region which should be horizontal between the multiple images, and determines whether or not the height information matches (step S504). When the height information matches, processing ends. When the height information does not match, the height information is adjusted between the compared images (step S505).

The value of the height to be adjusted is set by height information of any one of the multiple images, the user or the or the computer system 702. Finally, the height information after correction is output (step S506). The output can also be output to a storage region (not illustrated) of the computer system 702 or to the input and output device (user PC) 703 via the network 704, and an output destination is not limited to one.

A schematic diagram of a method of correcting a shift amount between a plurality of height information images in the pattern height information correction system illustrated in FIG. 8 is the same as FIGS. 6A and 6B in Example 1, and thus description thereof is omitted.

According to this example, it is possible to realize a pattern height information correction system with a simpler configuration than in Example 1.

The present invention is not limited to the examples described above, and includes various modification examples. For example, the examples described above have been described in detail in order to explain the present invention in an easy-to-understand manner, and are not necessarily limited to those having all the configurations described above.

REFERENCE SIGNS LIST

101: AFM-and-SEM integration device
102: electron beam column
103: AFM module
104: vacuum sample chamber
105: XY stage
106: first network
107: second network
108 first computer system
108a: computation processing unit
108b: control unit
108c storage unit
109: second computer system
109a computation processing unit
109b: image processing unit
110: input and output device (user PC)
111: design information database
112: process information database
201: semiconductor laser
202: cantilever
203: probe
204: sample
205: Z-direction scanner
206: X, Y-direction scanner
207: optical sensor
208: preamplifier
209: Z voltage feedback circuit
210: CPU
211: XY drive circuit
401: line pattern layer before correction
402: layer that should be horizontal before correction
403: approximated curved surface for correction
404: height information of line pattern after correction
601: first height information image
602: second height information image
603: shift amount of height information between multiple images
701: height information storage device
702: computer system
702a: computation processing unit
702b: image processing unit
703: input and output device (user PC)
704: network

The invention claimed is:

1. A pattern height information correction system comprising:
   contour line information of a pattern extracted from an acquired image including at least an atomic force microscope;
   a design information database that stores design information including at least layer information; and
   a computer system that divides the extracted pattern into regions based on the design information stored in the design information database relating to the extracted pattern and associates the divided regions with layer information,
   wherein the computer system specifies a horizontal region designated as horizontal in advance from the divided regions, creates an approximated curved surface based on the specified horizontal region corresponding to the same layer information, and corrects height information of the extracted pattern using the approximated curved surface.

2. The pattern height information correction system according to claim 1,
   wherein the computer system includes a first computer system and a second computer system interconnected via a network,
   the first computer system acquires the contour line information of the pattern extracted from the acquired image including at least the atomic force microscope, and
   when a value of a statistical value of the approximated curved surface exceeds a threshold value, the second computer system subtracts the approximated curved surface from the height information of the extracted pattern to obtain corrected pattern height information.

3. The pattern height information correction system according to claim 2,
   wherein, when a shift amount is present in height information of a plurality of patterns after correction corresponding to the same layer information, the second computer system adjusts the height information of the plurality of patterns after correction so as to eliminate the shift amount.

4. The pattern height information correction system according to claim 2,
   wherein the second computer system compares the value of the statistical value of the approximated curved surface with a threshold value designated in advance to determine whether or not correction of the height information of the pattern is necessary.

5. The pattern height information correction system according to claim 3,
   wherein the second computer system compares the value of the statistical value of the approximated curved surface with a threshold value designated in advance to determine whether or not correction of the height information of the pattern is necessary.

6. A pattern height information correction method which is used in a pattern height information correction system including contour line information of a pattern extracted from an acquired image including at least an atomic force microscope, a design information database that stores design information including at least layer information, and a computer system that divides the extracted pattern into regions based on the design information stored in the design information database relating to the extracted pattern and associates the divided regions with layer information, the pattern height information correction method comprising:

by the computer system,
specifying a horizontal region designated as horizontal in advance from the divided regions;
creating an approximated curved surface based on the specified horizontal region corresponding to the same layer information; and
correcting height information of the extracted pattern using the approximated curved surface.

7. The pattern height information correction method according to claim 6,
wherein the computer system includes a first computer system and a second computer system interconnected via a network,
the first computer system acquires the contour line information of a pattern extracted from the acquired image including at least the atomic force microscope, and
when a value of a statistical value of the approximated curved surface exceeds a threshold value, the second computer system subtracts the approximated curved surface from the height information of the extracted pattern to obtain corrected pattern height information.

8. The pattern height information correction method according to claim 7,
wherein, when a shift amount is present in the height information of a plurality of patterns after correction corresponding to the same layer information, the second computer system adjusts the height information of the plurality of patterns after correction so as to eliminate the shift amount.

9. The pattern height information correction method according to claim 7,
wherein the second computer system compares the value of the statistical value of the approximated curved surface with a threshold value designated in advance to determine whether or not correction of the height information of the pattern is necessary.

10. The pattern height information correction method according to claim 8,
wherein the second computer system compares the value of the statistical value of the approximated curved surface with a threshold value designated in advance to determine whether or not correction of the height information of the pattern is necessary.

* * * * *